United States Patent
Reineke et al.

(10) Patent No.: US 12,314,695 B2
(45) Date of Patent: May 27, 2025

(54) SYSTEM AND METHOD OF USING SUSTAINABILITY TO ESTABLISH COMPILATION METHODS ALIGNED WITH SUSTAINABILITY GOALS

(71) Applicant: Dell Products L.P., Round Rock, TX (US)

(72) Inventors: Nicole Reineke, Northborough, MA (US); Eloy Francisco Macha, Las Cruces, NM (US); Robert A. Lincourt, Franklin, MA (US); David Frattura, Stamford, CT (US)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 17/648,486

(22) Filed: Jan. 20, 2022

(65) Prior Publication Data

US 2023/0229409 A1     Jul. 20, 2023

(51) Int. Cl.
     *G06F 8/41*      (2018.01)
     *G06F 9/50*      (2006.01)

(52) U.S. Cl.
     CPC .............. *G06F 8/447* (2013.01); *G06F 8/433* (2013.01); *G06F 8/45* (2013.01); *G06F 9/50* (2013.01); *G06F 9/5055* (2013.01)

(58) Field of Classification Search
None
See application file for complete search history.

(56) References Cited

U.S. PATENT DOCUMENTS

| | | | |
|---|---|---|---|
| 5,966,538 A * | 10/1999 | Granston ................... | G06F 8/42 717/158 |
| 6,321,983 B1 | 11/2001 | Katayanagi et al. | |
| 7,617,133 B1 | 11/2009 | Antony et al. | |
| 8,447,569 B1 * | 5/2013 | Marwah ................ | G06F 11/008 702/179 |
| 9,191,217 B2 | 11/2015 | Martell | |
| 11,347,621 B1 * | 5/2022 | Alt ...................... | G06Q 10/0637 |
| 11,915,207 B2 | 2/2024 | Files et al. | |

(Continued)

FOREIGN PATENT DOCUMENTS

| | | |
|---|---|---|
| CA | 2926097 A1 | 4/2010 |
| EP | 0977137 A2 | 2/2000 |

(Continued)

OTHER PUBLICATIONS

M. Conti and S. Orcioni, "Cloud-based sustainable management of electrical and electronic equipment from production to end-of-life ," The International Journal of Quality & Reliability Management, vol. 36, (1 ), pp. 98-119, 2019. DOI: http://dx.doi.org/10.1108/IJQRM-02-2018-0055. (Year: 2019).

(Continued)

*Primary Examiner* — Jason D Mitchell
(74) *Attorney, Agent, or Firm* — Workman Nydegger

(57) ABSTRACT

Generating compilation methods using sustainability. Code is compiled in a manner that accounts for sustainability values. When a compilation request is received, sustainability values are identified. The resources needed to fulfill the compilation request are identified based on the sustainability values and available resources. Once the resources that are likely to best meet the sustainability values, the compilation request is performed using those resources.

8 Claims, 7 Drawing Sheets

(56) References Cited

U.S. PATENT DOCUMENTS

| | | | |
|---|---|---|---|
| 2002/0030100 A1 | 3/2002 | Katayanagi et al. | |
| 2003/0163559 A1* | 8/2003 | Dini | H04L 41/0894 709/223 |
| 2006/0015863 A1* | 1/2006 | Vaidyanathan | G06F 9/451 707/999.203 |
| 2006/0236310 A1* | 10/2006 | Domeika | G06F 8/443 717/140 |
| 2010/0088192 A1 | 4/2010 | Bowles et al. | |
| 2010/0153697 A1* | 6/2010 | Ford | H04L 9/3234 726/19 |
| 2010/0198671 A1 | 8/2010 | Prabhakar et al. | |
| 2010/0217631 A1 | 8/2010 | Boss et al. | |
| 2010/0217715 A1 | 8/2010 | Lipcon | |
| 2010/0250298 A1* | 9/2010 | Channabasavaiah | G06Q 10/06 705/7.36 |
| 2011/0060616 A1 | 3/2011 | Clark et al. | |
| 2011/0087522 A1* | 4/2011 | Beaty | H04L 41/12 705/308 |
| 2011/0225276 A1* | 9/2011 | Hamilton, II | G06F 9/5027 709/231 |
| 2013/0139132 A1* | 5/2013 | Kass | G06F 8/447 717/139 |
| 2013/0167127 A1* | 6/2013 | Gu | G06F 8/41 717/140 |
| 2013/0304925 A1 | 11/2013 | Ferris et al. | |
| 2014/0201218 A1* | 7/2014 | Catalano | G06F 8/77 707/748 |
| 2015/0169306 A1 | 6/2015 | Labocki et al. | |
| 2015/0358207 A1* | 12/2015 | Baldock | H04L 43/062 709/224 |
| 2016/0085528 A1* | 3/2016 | Kalogeropulos | G06F 8/443 717/153 |
| 2017/0008671 A1 | 1/2017 | Whitman et al. | |
| 2017/0031666 A1 | 2/2017 | Sathyanathan et al. | |
| 2018/0295010 A1 | 10/2018 | Grobe et al. | |
| 2018/0343169 A1 | 11/2018 | Stephens | |
| 2019/0033945 A1 | 1/2019 | Magcale et al. | |
| 2019/0056416 A1 | 2/2019 | Rodoni | |
| 2019/0347623 A1 | 11/2019 | Bostick et al. | |
| 2020/0143334 A1 | 5/2020 | Kayara | |
| 2020/0314145 A1* | 10/2020 | Bolignano | G06Q 10/103 |
| 2021/0049559 A1 | 2/2021 | Kilburn | |
| 2021/0081889 A1 | 3/2021 | Whitman et al. | |
| 2021/0082022 A1 | 3/2021 | Whitman et al. | |
| 2021/0173710 A1* | 6/2021 | Crossley | G06F 9/45558 |
| 2021/0365900 A1 | 11/2021 | Fedyski | |
| 2022/0414558 A1* | 12/2022 | Reineke | G06Q 10/06313 |
| 2022/0414562 A1* | 12/2022 | Reineke | G06Q 10/06313 |
| 2022/0414563 A1* | 12/2022 | Reineke | G06Q 30/018 |
| 2022/0414575 A1* | 12/2022 | Reineke | G06Q 10/06375 |
| 2022/0414576 A1* | 12/2022 | Reineke | G06Q 10/0633 |
| 2023/0138727 A1 | 5/2023 | Wong et al. | |
| 2023/0176641 A1 | 6/2023 | Magcale | |
| 2024/0095689 A1 | 3/2024 | Alon | |

FOREIGN PATENT DOCUMENTS

| | | |
|---|---|---|
| EP | 3388983 A1 | 10/2018 |
| WO | 2016/112099 A1 | 7/2016 |
| WO | 2017/007913 A1 | 1/2017 |
| WO | 2021/070182 A1 | 4/2021 |

OTHER PUBLICATIONS

M. McClellan and K. Harrison-Broninski, "Product meets process: product lifecycle management apps can help you gain control over disjointed activities, but globalization and emerging compliance requirements beg for a more process-oriented approach," Intelligent Enterprise, vol. 9, (2), pp. 37(5), 2006 (Year: 2006).

* cited by examiner

SYSTEM AND METHOD OF USING SUSTAINABILITY TO ESTABLISH COMPILATION METHODS ALIGNED WITH SUSTAINABILITY GOALS

FIELD OF THE INVENTION

Embodiments of the present invention generally relate to code compilation and execution aligned with sustainability goals. More particularly, at least some embodiments of the invention relate to systems, hardware, software, computer-readable media, and methods for dynamically compiling code to align with sustainability goals and policies.

BACKGROUND

Sustainability may be defined as the ability to meet present needs without compromising the ability to meet future needs. Sustainability has many elements including environmental components, social components, and economic components. When the individual goals of values of sustainability are considered, it is evident that some sustainability goals may contradict or compete with other sustainability goals. This is expected because the components of sustainability consider a wide range of policies.

Social sustainability goals, for example, may relate to education, community, equal opportunity, and opportunity. Environmental sustainability goals may relate to natural resource use and pollution prevention. Economic sustainability goals may relate to profits, cost savings, and research and development. Many of these goals can be applied to compute environments.

For example, in the context of computing, many users have heterogenous compute environments at their disposal. These compute environments may include core data centers, edge computing environment, and public clouds. Further, many users have an existing set of binaries, encapsulated code from interruptible languages, portable byte-code refactored binaries, or other executables.

When users are implementing sustainability goals, such as energy efficiency or carbon footprint awareness, the existing code may not be aligned with or satisfy the sustainability goals. For example, different types of code may not consume the same amount of energy or be associated the same amount of carbon generation when executed with respect to different computational environments.

A user may not know if their binaries (or other executables) include or use sustainable-centric code-snippets, functions, libraries, and the like and may not have access to the code of these binaries. A user may have many systems with different capabilities that may impact meeting sustainability goals. Further, the sustainability goals for different systems or sites may be different. Identifying and compiling executables that are aligned with sustainability values or goals is an area that needs improvement.

BRIEF DESCRIPTION OF THE DRAWINGS

In order to describe the manner in which at least some of the advantages and features of the invention may be obtained, a more particular description of embodiments of the invention will be rendered by reference to specific embodiments thereof which are illustrated in the appended drawings. Understanding that these drawings depict only typical embodiments of the invention and are not therefore to be considered to be limiting of its scope, embodiments of the invention will be described and explained with additional specificity and detail through the use of the accompanying drawings, in which.

DETAILED DESCRIPTION OF SOME EXAMPLE EMBODIMENTS

Embodiments of the present invention generally relate to sustainability. More particularly, at least some embodiments of the invention relate to systems, hardware, software, computer-readable media, and methods for dynamically compiling code to align with sustainability goals and practices. Embodiments of the invention relate to compiling code in a manner that accounts for sustainability goals across various resources.

Embodiments of the invention relate, generally, to sustainability operations. Sustainability operations include operations that account for sustainability values. Sustainability operations include analyzing resources such as code, functions, library, infrastructure, and the like to ensure that the selection of resources aligns with the sustainability values. Although there are distinctions between code, functions, libraries, binaries, executables, and the like, embodiments of the invention relate to the manner in when these are generated or assembled, which may generally be referred to herein as compiling. Thus, compiling may refer to generating a build manifest, identifying resources for use, generating a binary or executable, or the like. Compiling, as used herein, may be broader than converting source code into computer executable code. Compiling may include identifying functions, resources, libraries, executables, infrastructure, or the like.

Sustainability values can be organized in many different ways. Examples of sustainability values are set forth, by way of example and not limitation, in Appendix A, which is incorporated by reference in its entirety.

Sustainability goals can be impacted by code and/or infrastructure. Embodiments of the invention incorporate sustainability goals and policies, using sustainability values, when compiling code such that the code is better aligned with the sustainability goals and with awareness regarding the system or infrastructure in which the code is executed.

In one example, a sustainability engine can analyze and match sustainable-specific code, functions, and libraries to sustainable values. Once the code, functions, and libraries are identified, the sustainability engine may identify the systems or environments in which the code will be executed. The sustainability engine may then perform, for example, a best-fit match between the identified code, functions, and libraries to the available systems. The code is compiled, and an executable may be delivered. The executable may be tracked, and telemetry readings may be captured for auditing purposes and to improve the performance thereof.

Figure 1A:
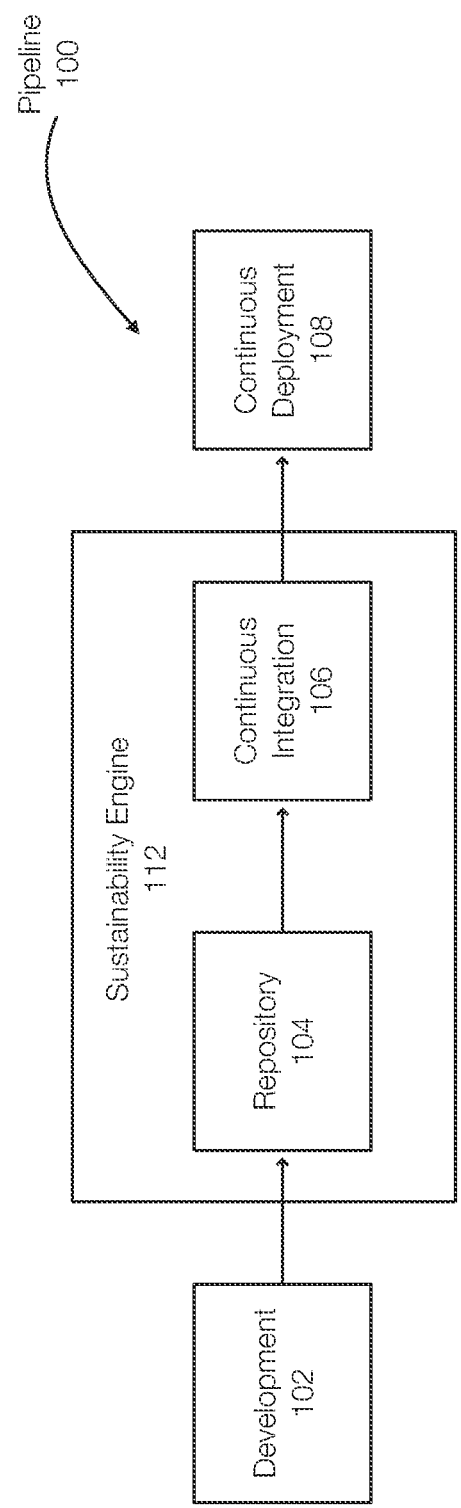
FIG. 1A discloses aspects of a sustainability engine that may be integrated into or used by a pipeline.

FIG. 1A discloses aspects of a development pipeline. While the pipeline 100 may be represented in different manners, the pipeline 100 is generally configured to move code additions, code changes, or the like to production. In this example, the pipeline 100 generally begins with code development 102. The code generated by a developer may then be stored in a repository 104. However, development 102 may also include infrastructure requests, infrastructure, settings, code updates, or the like.

Inputs to the repository 104 may trigger aspects of continuous integration 106 and continuous deployment 108 (CI/CD). Continuous integration 106 may relate to the process of testing and preparing for the deployment. Continuous deployment 108 may include deploying the code to the intended infrastructure.

The sustainability engine 112 operates at various stages of the pipeline 100 and is not limited to the stages that are illustrated by way of example in FIG. 1A. Although the sustainability engine 112 is not required to operate at any particular stage of the pipeline 100 but may focus on a specific stage or specific stages.

Embodiments of the invention allow code to be compiled or organized in a manner that accounts for sustainability goals and values. Generally, the sustainability engine 112 is configured to ensure that code is compiled or prepared in a manner that accounts for sustainability values.

The sustainability engine 112 may be integrated into the pipeline 100. When code is submitted to the repository 104, the sustainability engine 112 may operate to identify, by way of example, resources such as snippets, functions, infrastructure that the code should use or incorporate in order to align the code with sustainability values. Once these resources are identified, these resources can be organized or compiled such that the output is deployed in a manner that aligns with at least some sustainability values.

Figure 1B:
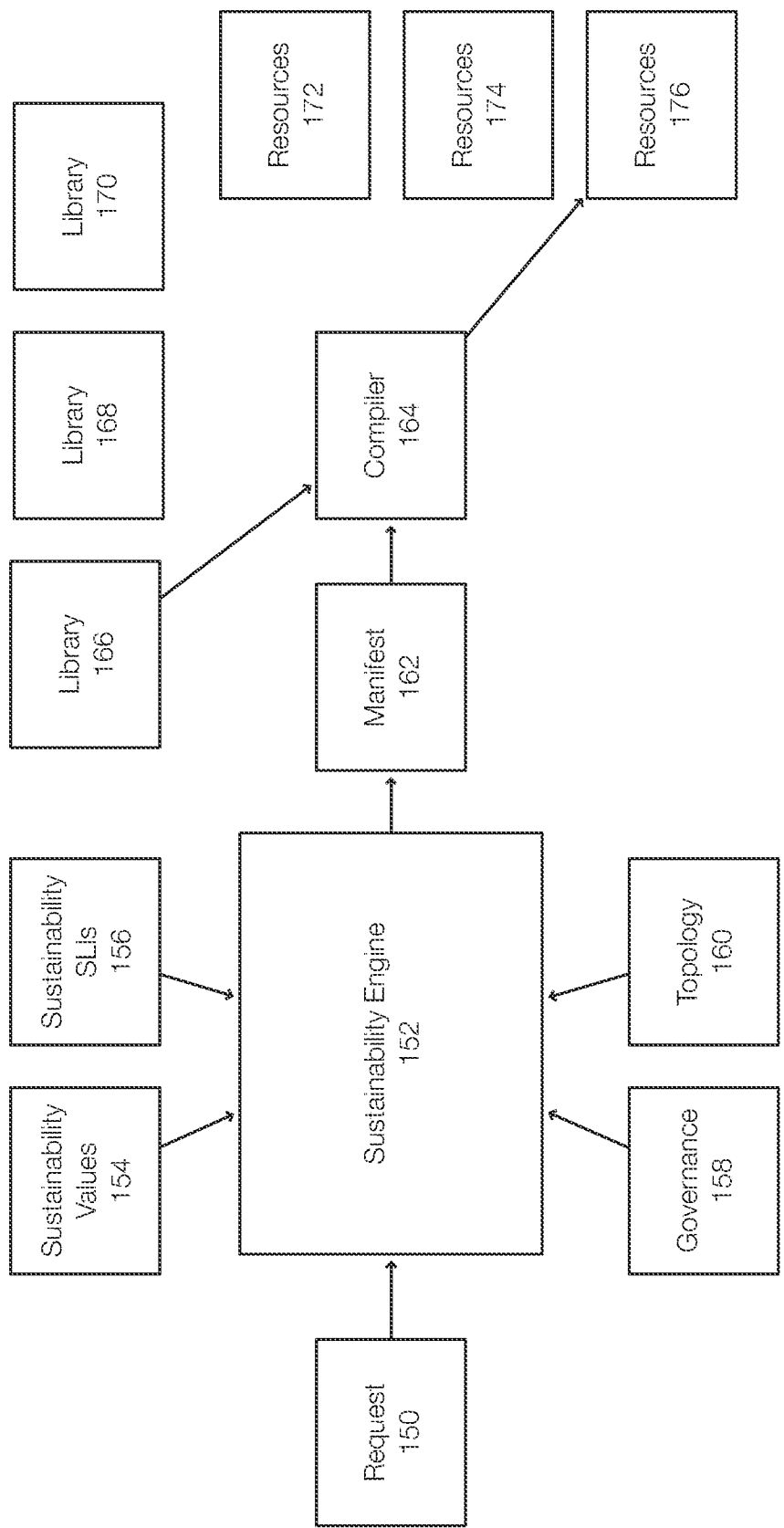
FIG. 1B discloses aspects of sustainability in computing development, deployment, and execution.

FIG. 1B discloses aspects of sustainability in code development and deployment. In this example, a request 150 (e.g., a compilation request) is received by a sustainability engine 152. The sustainability engine 152 then operates on the request by seeking information such as sustainability values 154, sustainability service level indicators (SLIs) 156, governance information 158, and topology information 160. This information allows the sustainability engine 152 to match or perform a best fit operation between the request 150, the desired sustainability values, and the resources that are accessible and available. This best fit may be reflected in a manifest 162.

The manifest 162 may identify the functions, libraries, or other resources that allow the code being deployed or generated by the compiler 164 to reflect the sustainability values. For example, the complier 164 may be able to use resources such as the libraries 166, 168, and 170 and may be able to use infrastructure or other resources such as the resources 172, 174, and 176. In this example, the request 150 is processed to generate a manifest 162 that reflects sustainability values. Based on the manifest 162, the compiler generates an executable that includes the library 166 and is deployed to the resources 176. If the sustainability value were to reduce power consumption, the library 166 and the resources 176 may represent the combination that achieves this power consumption value.

Figure 2:
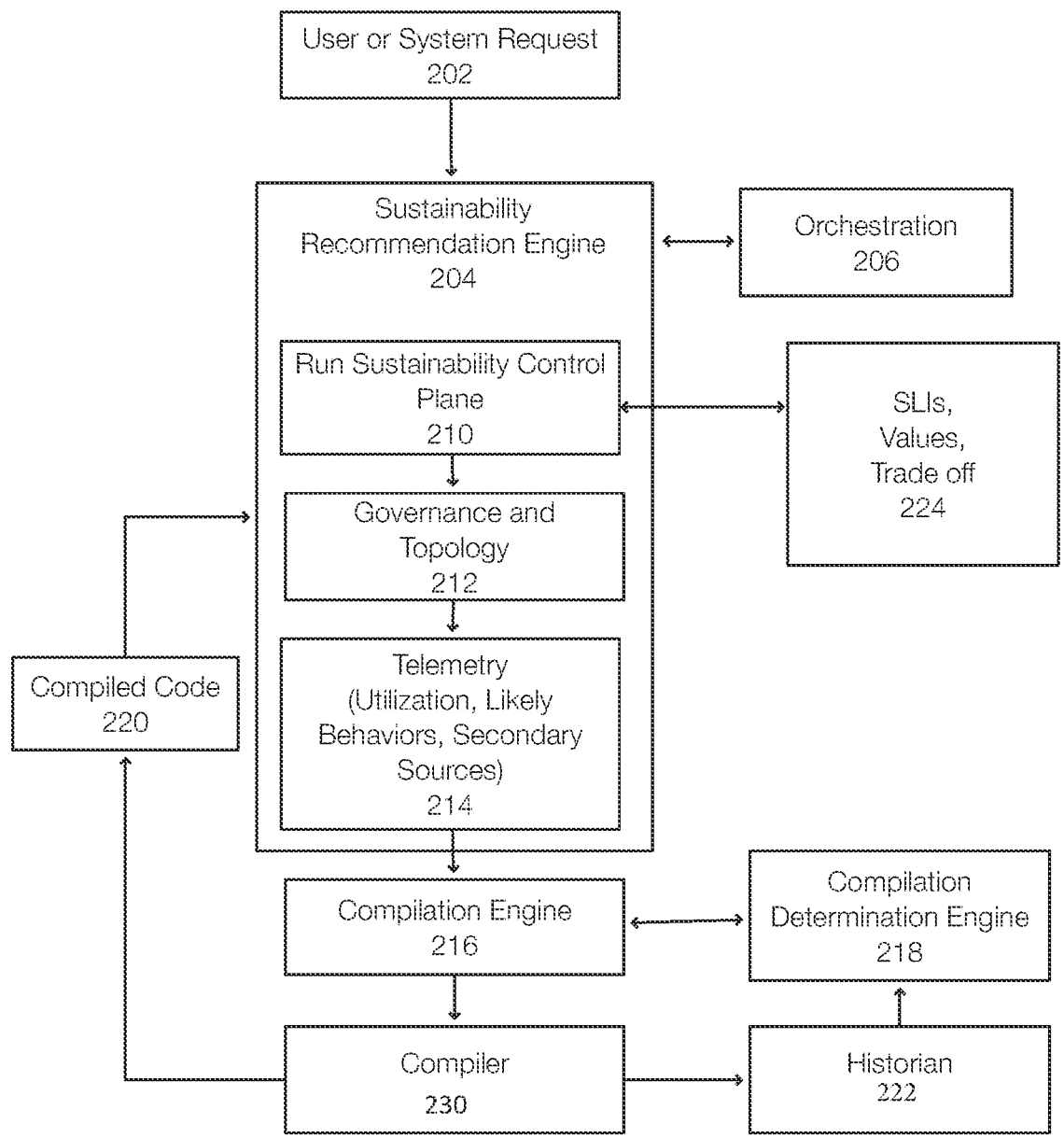
FIG. 2 discloses aspects of a method for establishing compilation methods aligned with sustainability.

FIG. 2 discloses aspects of sustainability operations. The method 200 may begin when a user or system request is received 202. The request many include a request for resources such as infrastructure resources, the addition of code to a repository, or the like. The request is received by or intercepted by a sustainability recommendation engine 204.

Once the request is identified by the sustainability recommendation engine 204 (engine 204), the engine 204 begins the process that allows the compiled code, which may result from the request, to be generated in a way that respects or accommodates at least some sustainability values.

The sustainability control plane 210 may access one or more datastores 224 to obtain or compile information related to, by way of example only, sustainability service level indicators (SLIs), sustainability values, and any potential trade-offs.

The SLIs, for example, may have been selected by a service provider, vendor, organization, or individual. SLIs may specify measurable behaviors, goals, or results and may include the locations at which to obtain data as well as the calculations and/or other details.

The sustainability values may be goals that are selected and/or prioritized by a service provider, vendor, organization, or individual. The sustainability values may map to one or more SLIs. For example, power consumption or other values related to sustainability can be measured or calculated.

Figure 3:
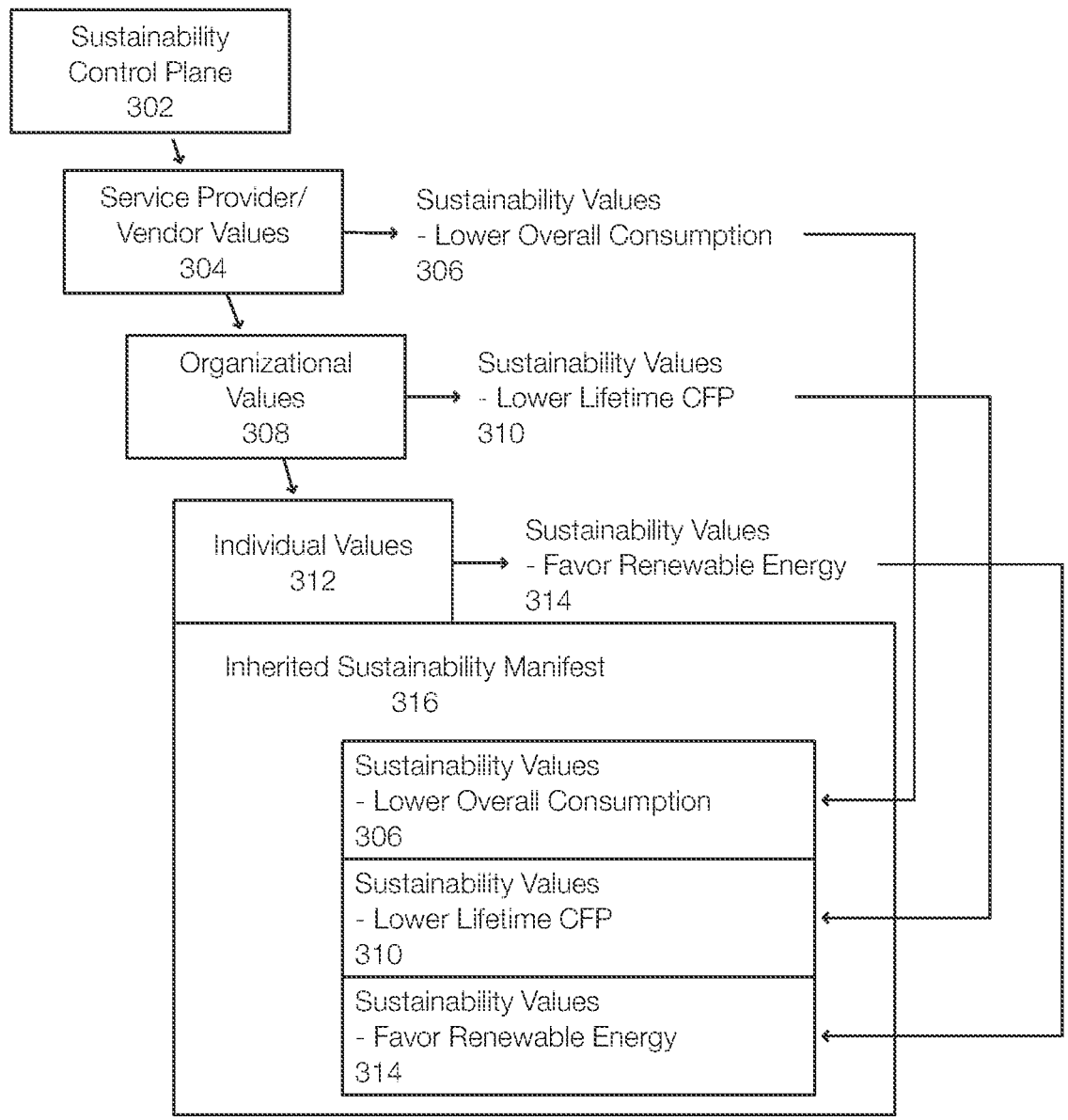
FIG. 3 discloses aspects of sustainability in compilation methods.

More specifically, the sustainability control plane 210 may compare recommended or inherited sustainability values with sustainability SLIs. FIG. 3 illustrates an example of inherited sustainability values. In the sustainability control plane 302 (an example of the sustainability control plane 210), the service provider or vendor values 304 are associated with organizational values 308, which are associated with individual values 312.

One sustainability value of the service provider/vendor is to lower overall consumption 306. One sustainability value of the organization is to lower the lifetime carbon footprint (CFP) 310. An individual sustainability value in this example is to favor renewable energy 314. The inherited sustainability manifest 316, thus includes to lower overall consumption 306, lower lifetime CFP 310, and to favor renewable energy 314.

During the comparison, it may be necessary to perform a trade off analysis to ensure that the results satisfy any minimum set of standards. For example, a government may set standards relative to, by way of example, calculations for adverse outcome, system conditions, resource flow, value creation, or the like. See www.epa.gov/sites/production/files/2014-10/documents/framework, which is incorporated by reference in its entirety for all purposes.

The sustainability value recommendations for a given request 202, which may be reflected in the sustainability values illustrated in FIG. 3 for example, can be evaluated in light of SLIs, secondary sources, and any trade-offs to generate an output request that is associated with resulting sustainability values.

Next governance and topology are performed 212. More specifically, the system may include a governance control plane and a topology plane. For example, a governance control plane may evaluate the resources that are accessible or available to the request or the user. The topology plane may identify what exists in light of available resources. Finally, telemetry 214 is performed. Telemetry may evaluate the utilization, likely behaviors, and secondary sources. The output of telemetry 214, from the input that came through the sustainability control plane 210 and governance and topology 212, may include a list of resources or assets that could be used. More specifically, the output of the sustainability recommendation engine 204 is a set of recommended assets and resources that may be used to meet the sustainability goals of a user or organization. The recommended assets or resources may include code snippets, functions, libraries, infrastructure, or the like or combinations thereof.

This set of asset and resource identification is provided to a compilation engine 216 that consults a determination engine 218. The compilation determination engine 218 may filter the known compiler options (including libraries, compilation settings, functions, and the like) and compare these options against the set or recommended resources output from the sustainability recommendation engine 204. This comparison is then matched against existing libraries, services, algorithms, or other compilation variables. The result is provided back to the compilation engine 216 as compilation settings, which may generate an assembly manifest (e.g., a build pack, or other form). The compiler 230 receives the assembly manifest and performs the compilation. The compiled code 220 is returned to the sustainability recommendation engine 204 and may be orchestrated 206 (e.g., deployed). The compiled code may simply be deployed.

The historian 222 may store information related to the calculations, decisions, inputs, and outputs, which may be used for audits, future calculations and analytics, or the like.

Figure 4:
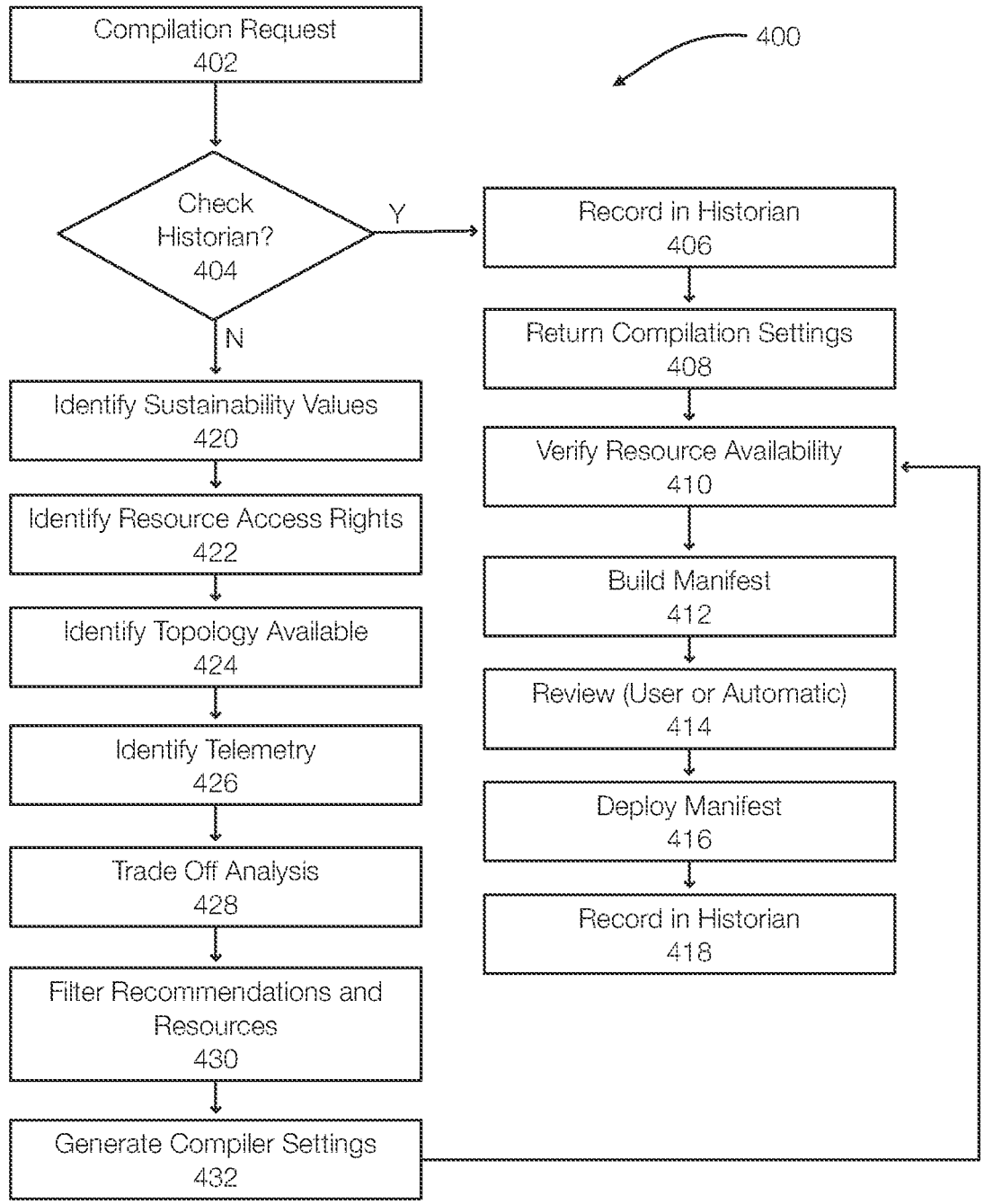
FIG. 4 discloses aspects of compiling and deploying code in a manner that considers sustainability values.

FIG. 4 discloses aspects of sustainably compiling code. In the method 400, a complication request 402 may be received. This may occur in the context of a pipeline and may be received by a sustainability engine operating in or in conjunction with the pipeline. When the request is received, the historian is checked 404 to see if the response has been pre-calculated or previously performed for this request or this request type. If so (yes at 404), the new compilation request is recorded 406 in the historian and the compilation settings are returned 408 or identified.

Once the compilation settings are identified, the resource availability is verified 410. If resources are available, a manifest is built 412. The manifest may be reviewed 414, if desired, by a user or automatically. The manifest is then deployed 416 to the resources and the actions are recorded 418 in the historian. Deploying the manifest may include compiling a binary or executable. This allows code to be compiled in a sustainable manner or in a manner that aligns with the sustainability values of the user.

If compilation settings do not exist (N at 404) for the compilation request 402, sustainability values are identified 420. The sustainability values may relate, by way of example and not limitation, to power consumption, carbon footprint, alternative energy, placement based on energy source, power consumption through up-to-date product refresh, predicted carbon footprint, manufacturing footprint, recycled material use, end of life impacts, or the like. These sustainability values may include inherited sustainability values as illustrated in FIG. 3.

Next, resource access rights are evaluated 422 and the topology is also identified 424. The access rights 422 allow the sustainability engine to identify what the user or requestor has access to and the topology identification 424 allows the sustainability engine to compare this with the resources that are actually available.

Telemetry may be performed 426. Telemetry may evaluate the probable behavior and may identify which resources can meet the probable behavior. In this example, the metrics for the SLIs may be captured in order to evaluate the telemetry in the context of the sustainability values.

A trade-off analysis 428 may be performed. In one example, the options may be scored and ranked. Next, using available resources and likely needs, which may be determined from the sustainability values 420, the resource access rights 422, the topology 424, and the telemetry 426, the recommendations, which includes resources for the request, are filtered 430. Filtering allows the resource recommendations most aligned with the request and the inherited sustainability values to be identified. Once the resource recommendations are complete, the compiler settings are generated 432.

Resource availability is verified 410 and the manifest is built 412. A review may be performed 414. After the review, the manifest is deployed 416 and the actions are recorded 418 in the historian.

Resource directed decision making can support the sustainability goals of an organization. Embodiments of the invention determine compilation options that map to the recommended asset utilization for an organization. For example, this may take the form of library matching based on asset utilization. In other example, specific code snippets that are optimized to use a specific resource in a way that is aligned with an organization's sustainability goals can be selected and included in the build manifest.

The historian and/or feedback loops can measure the utilization of the resource compilations and compilation options, which allows the capabilities of the systems that are used to be inferred. This further allows system behaviors to be confirmed or allows actual system behaviors to be realigned with sustainability priorities and/or goads.

For example, a user may use multiple cloud environments for machine learning workloads. In one workload, there is a desire to run an image processing subroutine on a series of videos. A request may be received to compile and run a developer pipeline to support the image processing work.

The sustainability service or engine receives the request and checks to determine whether inherited sustainability values exist for this request type, the type of compilation, and user. If present, a recent resource recommendation and compilation settings are checked. This may optionally be returned for approval or sent directly to the compiler or pipeline in deployment of the image processing work.

If this is a new request or user, the sustainability engine may intercept the request and determine the inherited sustainability values. In this example, the inherited sustainability values may identify a vendor sustainability value of a desire to pursue low power consumption and an organization sustainability value related to a lifetime carbon footprint for the consumption of resources. Thus, if an organization buys new hardware, the organization is responsible for reporting on the full product carbon footprint from manufacturing to decommissioning. The inherited sustainability values may also include an individual sustainability value of using recycled resources when possible.

In one example, these individual sustainability values may be weighted. Further, in the event of a conflict, the more specific value may be given priority.

Next, the governance control plane determines access rights. This is matched against topology available to the requesting user. The workload needs are then matched against the known available resources. From the possible providers, an ordered list is created using the inherited sustainability values as the rules and the sustainability SLIs against each resource in the telemetry plane. The ordered list is returned, and the trade-off analysis is performed to ensure that the recommendations to not have any unintended negative adverse outcomes.

The ordered list is returned to the compiler. The compiler may recommend an Intel graphics processing unit (GPU) type in a known set of resources. The compiler checks the compilation determination service to evaluate the compilation options and perform these evaluations. For example, there may be a library option to choose the Intel GPU optimized image processing library. The compilation engine then outputs a manifest that may be used for compilation. The compilation settings may identify the Intel GPU optimized image processing library. The compiler or pipeline may then perform the workload in accordance with the compilation generated from the compiler settings.

Figure 5:
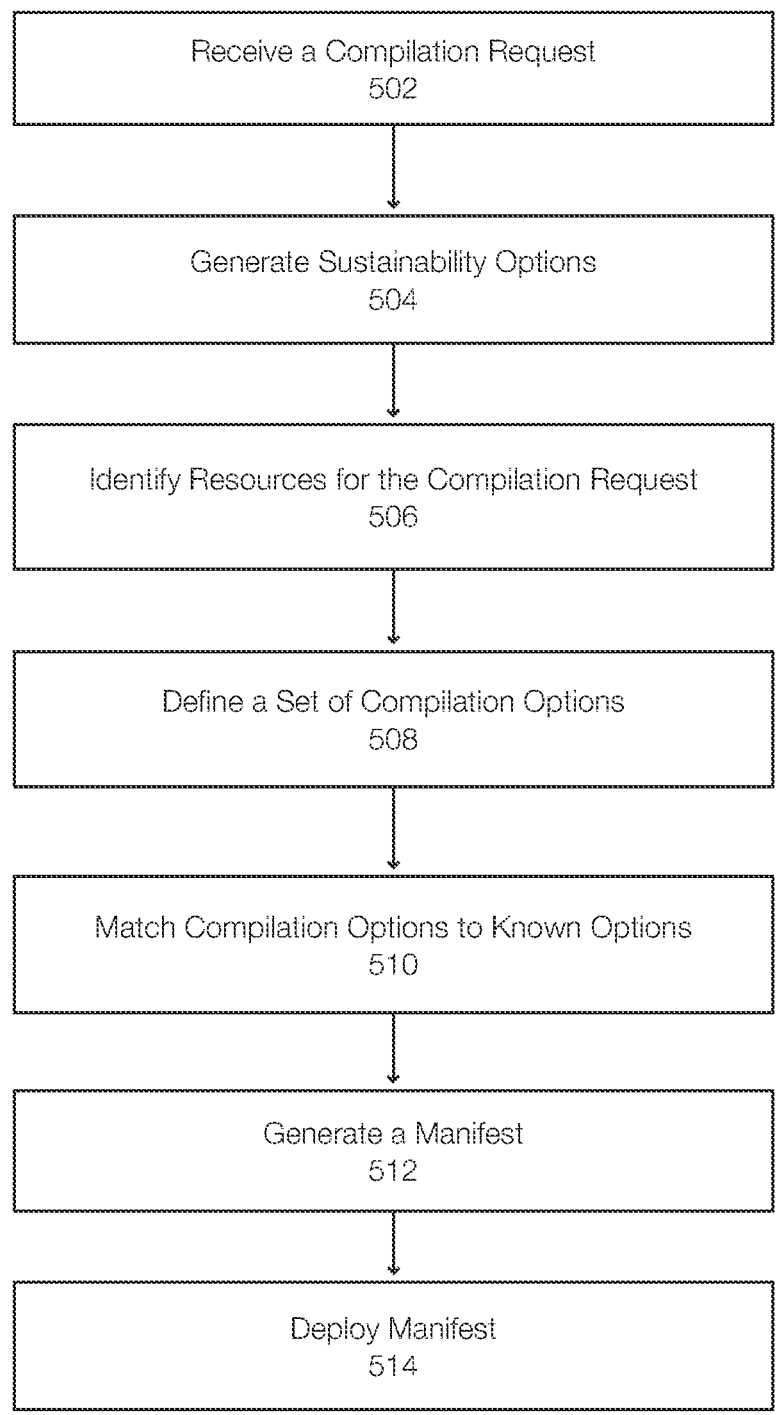
FIG. 5 discloses aspects of compilation methods.

FIG. 5 discloses aspects of sustainability options. In FIG. 5, a compilation request is received 502. In response to the compilation request, sustainability options 504 are determined. Sustainability options may be based on sustainability values, sustainability SLIs, trade-offs, or the like. Once the sustainability options are determined, the resources for the compilation request are identified 506. This may include determining or identify the resources the user or request may have access to and may also include determining or identifying the resources that are actually available.

Next, the set of compilation options is defined 508 by filtering these results based on telemetry information. The filtered or defined set of compilation options may be matched 510 to know compilation options. In example, the ideal compiler options are effectively matched to available compiler options. This allows a compiler component to generate 512 a manifest that reflect the sustainability values in the context of available resources. The manifest may then be deployed 514.

In general, embodiments of the invention may be implemented in connection with systems, software, and components, that individually and/or collectively implement, and/or cause the implementation of, sustainability operations. Sustainability operations including sustainability value analysis operations, compilation operations, and the like.

Example cloud computing environments, which may or may not be public, include storage environments that may provide data protection functionality for one or more clients. Another example of a cloud computing environment is one in which processing, data protection, and other, services may be performed on behalf of one or more clients. Some example cloud computing environments in connection with which embodiments of the invention may be employed include, but are not limited to, Microsoft Azure, Amazon AWS, Dell EMC Cloud Storage Services, and Google Cloud. More generally however, the scope of the invention is not limited to employment of any particular type or implementation of cloud computing environment.

In addition to the cloud environment, the operating environment may also include one or more clients that are capable of collecting, modifying, and creating, data. As such, a particular client may employ, or otherwise be associated with, one or more instances of each of one or more applications that perform such operations with respect to data. Such clients may comprise physical machines, virtual machines (VM), or containers.

Particularly, devices in the operating environment may take the form of software, physical machines, VMs, containers or any combination of these, though no particular device implementation or configuration is required for any embodiment.

It is noted that any of the disclosed processes, operations, methods, and/or any portion of any of these, may be performed in response to, as a result of, and/or, based upon, the performance of any preceding process(es), methods, and/or, operations. Correspondingly, performance of one or more processes, for example, may be a predicate or trigger to subsequent performance of one or more additional processes, operations, and/or methods. Thus, for example, the various processes that may make up a method may be linked together or otherwise associated with each other by way of relations such as the examples just noted. Finally, and while it is not required, the individual processes that make up the various example methods disclosed herein are, in some embodiments, performed in the specific sequence recited in those examples. In other embodiments, the individual processes that make up a disclosed method may be performed in a sequence other than the specific sequence recited.

Following are some further example embodiments of the invention. These are presented only by way of example and are not intended to limit the scope of the invention in any way.

Embodiment 1. A method, comprising: A method, comprising: receiving a compilation request at a sustainability engine, generating sustainability recommendations from the compilation request based on sustainability values and sustainability service level indicators, identifying potential resources for the compilation request, defining a set of compilation options based on the sustainability recommendations and the potential resources, matching the set of compilation options to a known set of compilation options to select specific compilation settings that at least partially align with the sustainability recommendations, generating a manifest that includes the specific compilation options, and deploying the manifest using resources identified in the manifest.

Embodiment 2. The method of embodiment 1, wherein the sustainability values include inherited sustainability values including organizational sustainability values and individual sustainability values.

Embodiment 3. The method of embodiment 1 and/or 2, further comprising identifying resources accessible to the compilation request.

Embodiment 4. The method of embodiment 1, 2, and/or 3, further comprising determining which of the resources are available.

Embodiment 5. The method of embodiment 1, 2, 3, and/or 4, further comprising determining a telemetry of the resources.

Embodiment 6. The method of embodiment 1, 2, 3, 4, and/or 5, further comprising generating the set of compilation operations based on the telemetry.

Embodiment 7. The method of embodiment 1, 2, 3, 4, 5, and/or 6, wherein the request comprises code and/or an infrastructure request.

Embodiment 8. The method of embodiment 1, 2, 3, 4, 5, 6, and/or 7, wherein the manifest comprises a best fit between the sustainability values and the resources identified in the manifest.

Embodiment 9. A method comprising: identifying sustainability values for a request received at a sustainability engine, determining resource access rights based on the sustainability values, identifying a topology from the resource access rights, determining a telemetry of the topology, generating compiler settings, based on the sustainability values, the topology, and the telemetry, that includes a set of recommended resources to at least partially meet the sustainability values, matching the set of recommended resources against known resources to generate a final set of resources for the request, and generating a compiled code from the final set of resources.

Embodiment 10. The method of embodiment 9, further comprising determining sustainability service level indicators, wherein the sustainability service level indicators are measurable and wherein the sustainability values map to the sustainability service level indicators.

Embodiment 11. The method of embodiment 9 and/or 10, wherein generating compiler settings includes identifying a first library rather than a second library because the first library better complies with the sustainability values in a specific infrastructure.

Embodiment 12. The method of embodiment 9, 10, and/or 11, further comprising generating an audit trail that includes all actions, decisions, calculations, inputs, and outputs impacting the generation of the compiled code.

Embodiment 13. A method for performing any of the operations, methods, or processes, or any portion of any of these, or any combination thereof disclosed herein.

Embodiment 14. A non-transitory storage medium having stored therein instructions that are executable by one or more hardware processors to perform operations comprising the operations of any one or more of embodiments 1-13.

The embodiments disclosed herein may include the use of a special purpose or general-purpose computer including various computer hardware or software modules, as discussed in greater detail below. A computer may include a processor and computer storage media carrying instructions that, when executed by the processor and/or caused to be executed by the processor, perform any one or more of the methods disclosed herein, or any part(s) of any method disclosed.

As indicated above, embodiments within the scope of the present invention also include computer storage media, which are physical media for carrying or having computer-executable instructions or data structures stored thereon. Such computer storage media may be any available physical media that may be accessed by a general purpose or special purpose computer.

By way of example, and not limitation, such computer storage media may comprise hardware storage such as solid state disk/device (SSD), RAM, ROM, EEPROM, CD-ROM, flash memory, phase-change memory ("PCM"), or other optical disk storage, magnetic disk storage or other magnetic storage devices, or any other hardware storage devices which may be used to store program code in the form of computer-executable instructions or data structures, which may be accessed and executed by a general-purpose or special-purpose computer system to implement the disclosed functionality of the invention. Combinations of the above should also be included within the scope of computer storage media. Such media are also examples of non-transitory storage media, and non-transitory storage media also embraces cloud-based storage systems and structures, although the scope of the invention is not limited to these examples of non-transitory storage media.

Computer-executable instructions comprise, for example, instructions and data which, when executed, cause a general-purpose computer, special purpose computer, or special purpose processing device to perform a certain function or group of functions. As such, some embodiments of the invention may be downloadable to one or more systems or devices, for example, from a website, mesh topology, or other source. As well, the scope of the invention embraces any hardware system or device that comprises an instance of an application that comprises the disclosed executable instructions.

Although the subject matter has been described in language specific to structural features and/or methodological acts, it is to be understood that the subject matter defined in the appended claims is not necessarily limited to the specific features or acts described above. Rather, the specific features and acts disclosed herein are disclosed as example forms of implementing the claims.

As used herein, the term 'module' or 'component' may refer to software objects or routines that execute on the computing system. The different components, modules, engines, and services described herein may be implemented as objects or processes that execute on the computing system, for example, as separate threads. While the system and methods described herein may be implemented in software, implementations in hardware or a combination of software and hardware are also possible and contemplated. In the present disclosure, a 'computing entity' may be any computing system as previously defined herein, or any module or combination of modules running on a computing system.

In at least some instances, a hardware processor is provided that is operable to carry out executable instructions for performing a method or process, such as the methods and processes disclosed herein. The hardware processor may or may not comprise an element of other hardware, such as the computing devices and systems disclosed herein.

In terms of computing environments, embodiments of the invention may be performed in client-server environments, whether network or local environments, or in any other suitable environment. Suitable operating environments for at least some embodiments of the invention include cloud computing environments where one or more of a client, server, or other machine may reside and operate in a cloud environment.

Figure 6:
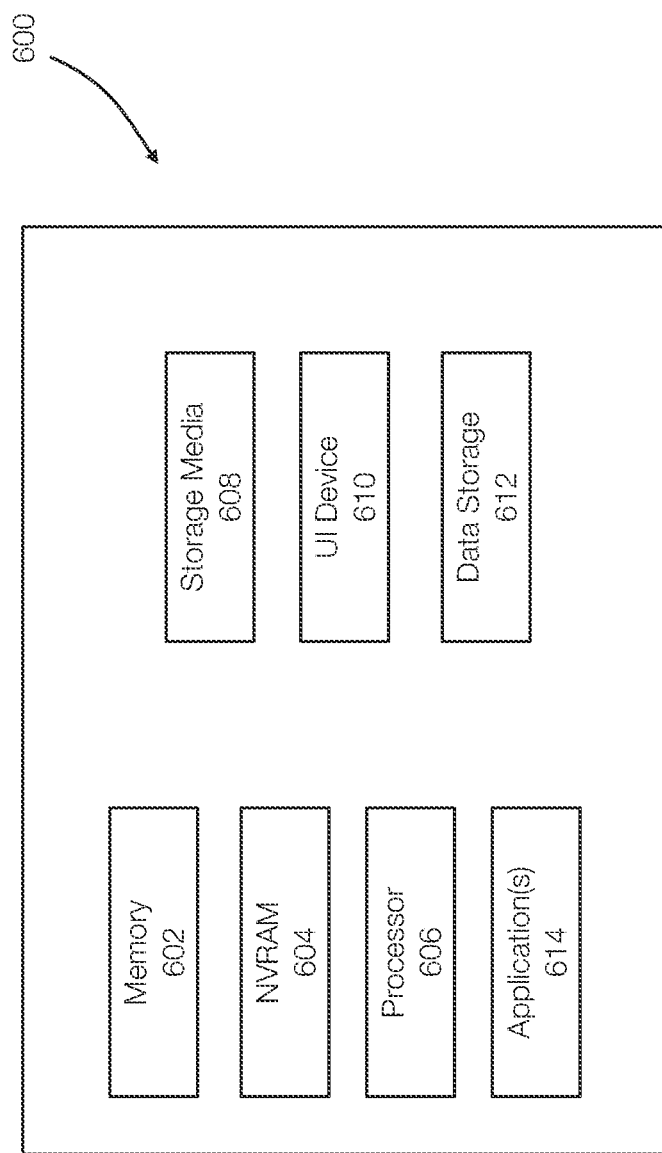
FIG. 6 discloses aspects of a computing device or a computing system.

With reference briefly now to FIG. 6, any one or more of the entities disclosed, or implied, by the Figures and/or elsewhere herein, may take the form of, or include, or be implemented on, or hosted by, a physical computing device, one example of which is denoted at 600. As well, where any of the aforementioned elements comprise or consist of a virtual machine (VM), that VM may constitute a virtualization of any combination of the physical components disclosed in FIG. 6.

In the example of FIG. 6, the physical computing device 600 includes a memory 602 which may include one, some, or all, of random-access memory (RAM), non-volatile memory (NVM) 604 such as NVRAM for example, read-only memory (ROM), and persistent memory, one or more hardware processors 606, non-transitory storage media 608, UI device 610, and data storage 612. One or more of the memory components 604 of the physical computing device 600 may take the form of solid-state device (SSD) storage. As well, one or more applications 614 may be provided that comprise instructions executable by one or more hardware processors 606 to perform any of the operations, or portions thereof, disclosed herein.

Such executable instructions may take various forms including, for example, instructions executable to perform any method or portion thereof disclosed herein, and/or executable by/at any of a storage site, whether on-premises at an enterprise, or a cloud computing site, client, datacenter, data protection site including a cloud storage site, or backup server, to perform any of the functions disclosed herein. As well, such instructions may be executable to perform any of the other operations and methods, and any portions thereof, disclosed herein.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method, comprising:
   receiving a compilation request of a source code at a sustainability engine from a requestor;
   generating, by a sustainability control plane, an inherited sustainability manifest that includes sustainability values of a service provider, sustainability values of an organization, and individual sustainability values;
   mapping sustainability values in the inherited sustainability manifest to service level indicators to determine and recommend sustainability values for the compilation request;
   performing governance to identify resources available to the requestor;
   performing topology evaluation to identify resources that exist in light of the resources available to the requestor;
   performing telemetry on the resources;
   filtering the resources to generate resource recommendations that are most aligned with the recommended sustainability values;
   generating specific compilation settings based on the recommended sustainability values and the resource recommendations;
   generating a manifest that includes the specific compilation options, wherein the manifest is a best fit between the compilation request and specific resources in the system to be used for compiling the source code and for executing the source code;
   compiling the source code to generate an executable code based on the potential resources and the specific compilation options in the manifest; and
   deploying the manifest and the executable code to the system.

2. The method of claim 1, wherein the request comprises code and/or an infrastructure request.

3. The method of claim 1, further comprising recording the compilation request and/or the manifest in a historian.

4. The method of claim 1, further comprising verifying that the recommended resources are available prior to building the manifest.

5. The method of claim 1, wherein the telemetry includes utilization, likely behaviors, and secondary sources.

6. The method of claim 1, wherein the mapping sustainability values in the inherited sustainability manifest to service level indicators to determine and recommending sustainability values for the compilation request includes performing a trade off analysis to prevent adverse outcomes.

7. A non-transitory storage medium having stored therein instructions that are executable by one or more hardware processors to perform operations comprising:
   receiving a compilation request of a source code at a sustainability engine from a requestor;
   generating, by a sustainability control plane, an inherited sustainability manifest that includes sustainability values of a service provider, sustainability values of an organization, and individual sustainability values;
   mapping sustainability values in the inherited sustainability manifest to service level indicators to determine and recommend sustainability values for the compilation request;
   performing governance to identify resources available to the requestor;
   performing topology evaluation to identify resources that exist in light of the resources available to the requestor;
   performing telemetry on the resources;
   filtering the resources to generate resource recommendations that are most aligned with the recommended sustainability values;
   generating specific compilation settings based on the recommended sustainability values and the resource recommendations;
   generating a manifest that includes the specific compilation options, wherein the manifest is a best fit between the compilation request and specific resources in the system to be used for compiling the source code and for executing the source code;
   compiling the source code to generate an executable code based on the potential resources and the specific compilation options in the manifest; and
   deploying the manifest and the executable code to the system.

8. The non-transitory storage medium of claim 7, wherein the request comprises code and/or an infrastructure request.

* * * * *